United States Patent
Fine

(10) Patent No.: US 11,126,990 B1
(45) Date of Patent: *Sep. 21, 2021

(54) GEOFENCED PAYMENTS

(71) Applicant: Wells Fargo Bank, N.A., San Francisco, CA (US)

(72) Inventor: Haila Fine, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,783

(22) Filed: Oct. 25, 2019

Related U.S. Application Data

(63) Continuation of application No. 14/507,281, filed on Oct. 6, 2014, now Pat. No. 10,460,305.

(51) Int. Cl.
*G06Q 20/22* (2012.01)

(52) U.S. Cl.
CPC .................... *G06Q 20/22* (2013.01)

(58) Field of Classification Search
CPC ..................................... G06Q 20/22
See application file for complete search history.

(56) References Cited

U.S. PATENT DOCUMENTS

| | | | |
|---|---|---|---|
| 7,013,128 B2 | 3/2006 | Ozeki et al. | |
| 7,464,046 B2 * | 12/2008 | Wilson | G06Q 10/06 705/7.15 |
| 8,407,121 B2 | 3/2013 | Paintin | |
| 8,438,066 B1 | 5/2013 | Yuen et al. | |
| 9,070,162 B2 | 6/2015 | Cherry et al. | |
| 9,614,784 B1 | 4/2017 | Houston et al. | |
| 10,467,564 B2 * | 11/2019 | Hull | H04W 4/029 |
| 10,831,348 B1 * | 11/2020 | Sar | G06F 3/017 |
| 2006/0085310 A1 * | 4/2006 | Mylet | G06Q 40/00 705/35 |
| 2007/0043650 A1 | 2/2007 | Hughes et al. | |
| 2009/0327134 A1 * | 12/2009 | Carlson | G06Q 20/3223 705/44 |
| 2011/0029352 A1 * | 2/2011 | Lau | G06Q 30/0607 705/7.41 |
| 2011/0134765 A1 | 6/2011 | Rector et al. | |
| 2012/0101887 A1 | 4/2012 | Harvey et al. | |
| 2012/0209768 A1 | 8/2012 | Nuzzi | |

(Continued)

FOREIGN PATENT DOCUMENTS

| | | | | |
|---|---|---|---|---|
| WO | WO-03102842 A1 * | 12/2003 | | G06Q 10/10 |
| WO | WO-2015/143412 A1 | 9/2015 | | |

OTHER PUBLICATIONS

Deng et al. Maximizing the Number of Worker's Self-Selected Tasks in Spatial Crowdsourcing. ACM SIGSPATIAL '13, Nov. 5-8, pp. 314-323 (2013). (Year: 2013).*

(Continued)

*Primary Examiner* — Virpi H Kanervo
(74) *Attorney, Agent, or Firm* — Foley & Lardner LLP

(57) ABSTRACT

A geographic location is received in which a payment recipient is to perform a task. A geolocation system determines that the recipient is at the geographic location based on information received from a mobile device of the recipient. Payment is electronically transferred to the recipient for completion of the task via a payment network. The payment is transferred responsive to determining that the recipient is at the geographic location.

23 Claims, 5 Drawing Sheets

(56) References Cited

U.S. PATENT DOCUMENTS

| | | |
|---|---|---|
| 2012/0209773 A1 | 8/2012 | Ranganathan |
| 2012/0265585 A1 | 10/2012 | Muirbrook et al. |
| 2012/0316963 A1 | 12/2012 | Moshfeghi |
| 2013/0030931 A1 | 1/2013 | Moshfeghi |
| 2013/0045753 A1 | 2/2013 | Obermeyer et al. |
| 2013/0090969 A1* | 4/2013 | Rivere .................. G06Q 10/06 705/7.19 |
| 2013/0091452 A1 | 4/2013 | Sorden et al. |
| 2013/0198076 A1 | 8/2013 | Zambelli Hosmer et al. |
| 2014/0057648 A1 | 2/2014 | Lyman et al. |
| 2014/0066090 A1 | 3/2014 | Henderson |
| 2014/0095384 A1 | 4/2014 | Basha |
| 2014/0337074 A1* | 11/2014 | Taylor .................. G06Q 40/12 705/7.13 |

OTHER PUBLICATIONS

Sadilek at al. Crowdphysics: Planned and Opportunistic Crowdsourcing for Physical Tasks. Proceedings of the Seventh International AAAI Conference on Weblogs and Social Media, pp. 536-545 (2013). (Year: 2013).*

Brown et al. Usability of Geographic Information: Current Challenges and Future Directions. Applied Ergonomics, 44, pp. 855-865 (2013). (Year: 2013).*

Geo-fencing for mJobTime's Mobile Time Tracking Software; MobileTime—Mobile Time Tracking Blog for Construction, posted Mar. 22, 2011, retrieved from the internet at: http://www.mjobtime.com/blog/bid/28647/Geo-fencing-For-mJobTime-s-Mobile-Time-Tracking-Software, 2 pages.

* cited by examiner

GEOFENCED PAYMENTS

CROSS REFERENCE TO RELATED APPLICATIONS

The present Application is a continuation of U.S. patent application Ser. No. 14/507,281 filed on Oct. 6, 2014, the entire disclosure of which is incorporated by reference herein.

BACKGROUND OF THE INVENTION

The present disclosure generally relates to the field of mobile payment systems. Specifically, the present disclosure relates to systems and methods for enabling individuals to make or receive payments using a computer system or mobile device.

Payments for products and services are often completed using credit cards, debit cards, checks or cash. At the same time, most people carry some type of mobile handheld electronic device with a wireless internet connection and GPS capabilities. A person may wish to make payments to merchants or transfer funds to other individuals using these mobile devices. Enhanced systems and methods of facilitating such transactions would be desirable.

SUMMARY OF THE INVENTION

According to an example embodiment, a payment is provided to a recipient for completion of a task. The method includes receiving, based on a user selection, a geographic location in which the recipient is to perform the task. The method further includes determining that the recipient is at the geographic location based on information received from a mobile device of the recipient. The method further includes electronically transferring the payment to the recipient for completion of the task via a payment network. The payment is transferred responsive to determining that the recipient is at the geographic location.

According to another example embodiment, payment is provided to a recipient for completion of a task. A task is received for the recipient to perform, a geographic location is received in which the recipient is to perform the task, and an amount of time that the recipient must be present within the geographic location is received. A mobile device associated with the recipient communicates with a geolocation payment system. The time the recipient enters the geographic location is determined. The time the recipient exits the geographic location is determined. The recipient's position within the geographic location is monitored. The recipient's movements within the geographic location are determined based on monitoring the recipient's position within the geographic location. Whether the recipient's movements within the geographic location fit predefined movement parameters associated with the task is determined. Payment is electronically transferred to the recipient based on whether the recipient's movements within the geographic location fit predefined movement parameters associated with the task.

DETAILED DESCRIPTION OF THE PREFERRED EMBODIMENTS

Figure 1:
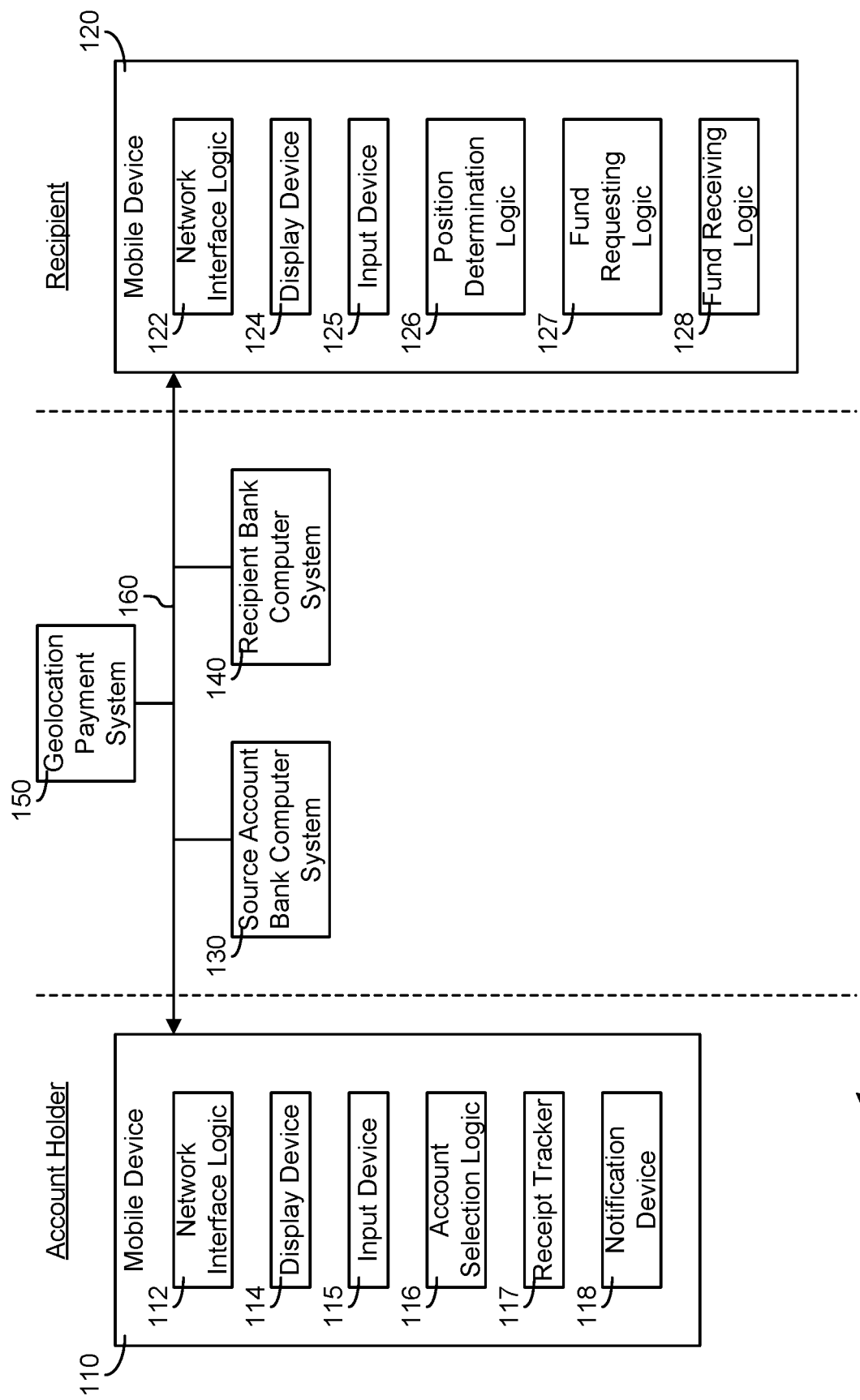
FIG. 1 is a block diagram of a computer-implemented payment processing system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing location-based payments are described. More particularly, the present disclosure relates to processing a payment to a payee based on monitoring the payee entering a geographic location. In some embodiments, processing the payment may be based on other factors, such as the amount of time the payee is present within the geographic location, movement of the payee within the geographic location, whether the movement of the payee within the geographic location corresponds to movements typical of a task, etc. Information about the payee, such as location and time spent within the geographic location, may be transmitted to the account holder using wireless technologies, such as Bluetooth, low energy Bluetooth, RFID, hypersonic communications, Wi-Fi, cellular 3G, 4G, GSM, LiFi, etc. The systems and methods described herein may be implemented for users having a mobile wallet implemented on a mobile device, a mobile banking application, or other payment processing application which allows users access to accounts via mobile devices to provide payments to recipients, such as service providers or other users. It will be appreciated that the systems and methods disclosed herein are not limited to cash transactions, and may include payments or transactions of other valuable information, such as rewards, coupons, loyalty points, passwords, building code numbers, and so on.

Generally referring to the Figures, systems and methods for providing a payment to a recipient/payee for completion of a task are disclosed. In one embodiment, a geolocation payment system receives inputs from an account holder and transmits information to the recipient/payee based on the received inputs. For example, an account holder may select an amount of payment and a geographic location where the task should be completed (e.g., the account holder's residence, a business location, etc.). In some embodiments, the geolocation payment system receives, based on an account holder's selection, an amount of time that the recipient/payee must be present within the geographic location to receive payment. The payment system communicates with a mobile device carried by the recipient/payee to determine when the recipient/payee enters the geographic location. Similarly, the payment system may communicate with the recipient/payee's mobile device for other reasons, such as to monitor the amount of time the recipient/payee is present within the geographic location, or to monitor the recipient/payee's position within the geographic location. In some embodiments, the system determines the recipient/payee's movements within the geographic location based on monitoring the recipient/payee's position. Payment is electronically transferred to the recipient/payee based on the geolocation payment system receiving the geographic location selected by the account holder, the amount of time the recipient/payee is present within the geographic location, and/or based on whether the payee's movements within the geographic location correspond with the task.

Referring to FIG. 1, a computer-implemented payment processing system 100 is shown according to an example embodiment. The payment processing system 100 may be used to set up and utilize a mobile payment system, such as a geolocation payment system or mobile wallet. Users may be business entities and/or individual consumers that have one or more source accounts with a financial institution. The source accounts may include business or consumer demand deposit, credit card, debit card accounts, lines of credit, and so on. A mobile payment account may be created for the user to transmit funds from a source account to pay for goods or services to a merchant, business, or individual. Additionally, funds can be transferred from the source account to another person for purposes beyond purchasing goods or paying for services, such as distributing allowances.

The payment processing system 100 may include, among other systems, an account holder mobile device 110, a recipient mobile device 120, a source account bank computer system 130, a recipient bank computer system 140, and a geolocation payment system 150. The various systems may communicate through a network 160, which may include one or more of the Internet, cellular network, Wi-Fi, Wi-Max, a proprietary banking network, or any other type of wired or wireless network. In some embodiments, the source account bank computer system 130 and recipient bank computer system 140 may be owned by the same entity. In other embodiments, the source account bank computer system 130 and recipient bank computer system 140 may be owned by different entities.

The source account bank computer system 130, the recipient bank computer system 140, and the geolocation payment system 150 may each include a computer system (e.g., one or more servers each with one or more processing circuits), each including a processor and memory. The processors may be implemented as microprocessors, application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include data base components, object code components, script components, or any other type of information structure for supporting the various activities and information structures described herein. The memory may be communicably connected to the processor and include computer code or instructions for executing one or more processes described herein.

The account holder mobile device 110 may be used by an individual (e.g., a business owner or employee, a consumer, etc.) to schedule a payment to a recipient. The account holder mobile device 110 may be, for example, a cellular phone, smart phone, mobile handheld wireless e-mail device, personal digital assistant, portable gaming device, or other suitable device. The account holder mobile device 110 includes a network interface logic 112, a display device 114, an input device 115, account selection logic 116, a receipt tracker 117, and a notification device 118.

The network interface logic 112 may include, for example, program logic that connects the mobile device 110 to the network 160. For example, the mobile device 110 may receive and display screens including account information, transaction instructions, and so on. In one embodiment, a screen may be used to request username and password information from the account holder, to prompt the account holder to provide information regarding a payment (e.g., the amount of payment, including any reductions or increases, etc.) and which merchant or individual (e.g., name, address, phone number or e-mail, a selection of a recipient by the account holder from his/her memory or from the mobile device 110, etc.) is to receive the payment. Such screens are presented to the account holder via the display device 114.

The input device 115 may be used to communicate with the geolocation payment system to permit the account holder to access accounts, schedule tasks, select merchants or individuals to assign scheduled tasks, and to facilitate receiving information from merchants or individuals. The input device 115 may include, for example, a keypad or keyboard, a touchscreen, a microphone, or any other device that allows the account holder to access the payment processing system 100. As will be appreciated, in addition to or instead of the mobile device 110, account holders may also be provided with the ability to access the payment processing system 100 using another type of computer (e.g., a desktop or laptop computer executing browser software) to perform the operations described herein as being performed by the mobile device 110.

The account selection logic 116 allows the account holder to choose any one or more accounts to transfer funds to the recipient for goods or services. In some embodiments, the account holder may only be able to make payments from one account or the account holder may select a default account that is used to make payments. The account holder may use the account selection logic 116 to select the account the account holder wants to use to pay the recipient.

The receipt tracker 117 may be used by the account holder to track receipts received in connection with transactions. In one embodiment, the source account bank computer system 130 transmits receipts to the account holder mobile device 110 for viewing. The receipts may be sent from the recipient bank computer system 140 to the account holder bank computer system 130 upon completion of a transaction with the recipient. As described in greater detail below, the receipt tracker 117 may provide various tools to the account holder. For example, the receipt tracker 117 may be configured to generate a display informing the account holder regarding how much money the account holder has spent on certain types of tasks or how much money the account holder has sent to certain merchants or individuals. The receipt tracker 117 may enable the account holder to search receipts, generate expense reports, and so on.

The notification device 118 may be used to generate a notification on account holder mobile device 110 to notify the account holder that a payment has been electronically transferred to the recipient, or to prompt the account holder to confirm payment after the recipient has completed the assigned task. Notifications may include pop-up notifications, push notifications, in-app notifications, sound notifications, textual notifications, and so on. Notifications may include the arrival time of the recipient, the time the task was completed, rooms entered, the amount of time spent in each room, and so on.

The recipient mobile device 120 may be used by an individual, including a business owner or employee, to receive payment for entering a certain geographic location or for performing an assigned task. The recipient mobile device 120 may be, for example, a cellular phone, smart phone, mobile handheld wireless e-mail device, personal digital assistant, portable gaming device, or other suitable device. The recipient mobile device 120 includes a network interface logic 122, a display device 124, an input device 125, position determination logic 126, fund requesting logic 127, and fund receiving logic 128.

The network interface logic 122 may include, for example, program logic that connects the mobile device 120 to the network 160, including in some embodiments authentication methods. For example, the mobile device 120 may receive and display screens including task instructions, payment information, and so on. In one embodiment, a screen may be used to request a username and password information from the recipient and to prompt the recipient to accept tasks from the account holder. Such screens are presented to the recipient via the display device 124. It will be appreciated that other authentication methods may be used.

The input device 125 may be used to permit the recipient to initiate account access, accept tasks, review information relating to tasks (e.g., time, location, description of the task), and to facilitate communications or otherwise receive information from the account holder. The input device 125 may include, for example, a keypad or keyboard, a touchscreen, a microphone, or any other device that allows the recipient to access the payment processing system 100. As will be appreciated, in addition to or instead of the mobile device 120, recipients may also be provided with the ability to access the payment processing system 100 using another type of computer (e.g., a desktop or laptop computer executing browser software) to perform the operations described herein as being performed by the mobile device 120. The recipient mobile device 120 may additionally include account selection logic to allow the recipient to choose any one or more accounts to transfer funds into when received from the account holder. The recipient mobile device 120 may also include a receipt tracker to track payments received from the account holder and for displaying payment information on display device 124 for viewing. The recipient mobile device 120 may also include a notification device used to generate notifications on the recipient mobile device 120 to notify the recipient that a payment has been electronically transferred to the recipient. Notifications may include pop-up notifications, push notifications, in-app notifications, sound notifications, textual notifications, and so on.

The position determination logic 126 is used by the geolocation payment system to determine the position of the recipient mobile device 120. The position determination logic 126 provides information that may be used by the geolocation payment system to determine the position of the recipient carrying the recipient mobile device 120. In some embodiments, information provided by the position determination logic 126 may be used to determine when the recipient enters the geographic location in which the assigned task is to be completed. As further discussed below, information provided by the position determination logic 126 may be used to determine when the recipient exits the geographic location, track the position of the recipient within the geographic location, determine when the recipient enters specific areas of the geographic location, etc.

The position of the recipient mobile device 120 may be determined in a variety of ways, depending on the desired level of precision. In some embodiments, it may be sufficient to determine that the recipient is at a particular geographic location, i.e., without being able to determine the position of the recipient within the location at any greater level of detail. For example, the system 100 may be configured such that the recipient receives payment in response to having shown up at the specified geographic location. For example, the recipient may be a house cleaner with whom the account holder/homeowner has an established business relationship. The homeowner may feel comfortable paying the house cleaner responsive to the house cleaner showing up at the house (and trusting that the house cleaner to clean the house upon arrival).

In such an embodiment, the position of the recipient (i.e., that the recipient is at the house) may be determined in a variety of ways. For example, the mobile device 120 of the recipient may have an application installed thereon that transmits the GPS coordinates of the mobile device 120 to the geolocation payment system 150. The geolocation payment system 150 may then compare the GPS coordinates of the recipient with the coordinates of the home to determine that the house cleaner is at the home of the user. As another example, instead of GPS, position triangulation based on cell phone towers may be used. As another example, the mobile device 120 may have an application installed thereon that is configured to implement a handshake protocol with a local Wi-Fi network. For example, upon arriving at the user's house, the mobile device 120 may establish a connection with the wireless network at the user's house and thereafter transmit a message to the geolocation payment system 150. The geolocation payment system may therefore determine that the mobile device 120 is at the user's house based upon recognizing a match of the IP address of the mobile device 120 with the wireless network of the user's house. Alternatively, computer hardware/software executing at the user's house may determine that the mobile device 120 has established a connection with the wireless network, and transmit a message to that effect to the geolocation payment system 150. As another example, the mobile device 120 may establish a wireless connection with other devices at the user's house, e.g., electronic appliances, electronic wall fixtures (e.g., Nest Thermostat), sensors, proximity beacons, and so on.

In some embodiments, it may be desirable to determine the position of the mobile device 120 with a higher level of precision. For example, it may be desirable to monitor movements of the recipient at the location, e.g., to determine how much time was spent cleaning various rooms of the house. In some embodiments, such precision may be achieved using the GPS sensor on the mobile device 120. In some embodiments, the system may be integrated with a security system that may detect (e.g., using motion sensors, door sensors, etc.) when the recipient enters the geographic location or an identified sub-area of the geographic location.

As another example, such precision may be achieved using proximity beacons that are placed strategically throughout the geographic location, e.g., the house. Each beacon may include memory that stores program modules that, when executed by the processor, control operation of the beacon. The beacons may also store a unique beacon identifier and include a transmitter (e.g., a Bluetooth® transmitter) that broadcasts the unique beacon identity within a limited, configurable range of the beacon. In some arrangements, the beacons are Bluetooth® Low Energy beacons (e.g., iBeacons®). The maximum broadcast range may be increased or decreased by respectively increasing or decreasing the broadcast power of each beacon. In some arrangements, the geolocation payment system 150 maintains a database (sometimes for each account holder) of beacon identities and associated locations. Each entry in the database includes a beacon identity (e.g., a serial number that is broadcast from the beacon) and an associated location (e.g., an identifier of the geographic location and an identifier of the placement within or outside of the geographic location). When the recipient mobile device 120 detects a beacon, the beacon identifier may be transmitted to the geolocation payment system 150, thereby enabling the geolocation payment system 150 to determine the precise location of the mobile device 120 within the house.

Figure 2:
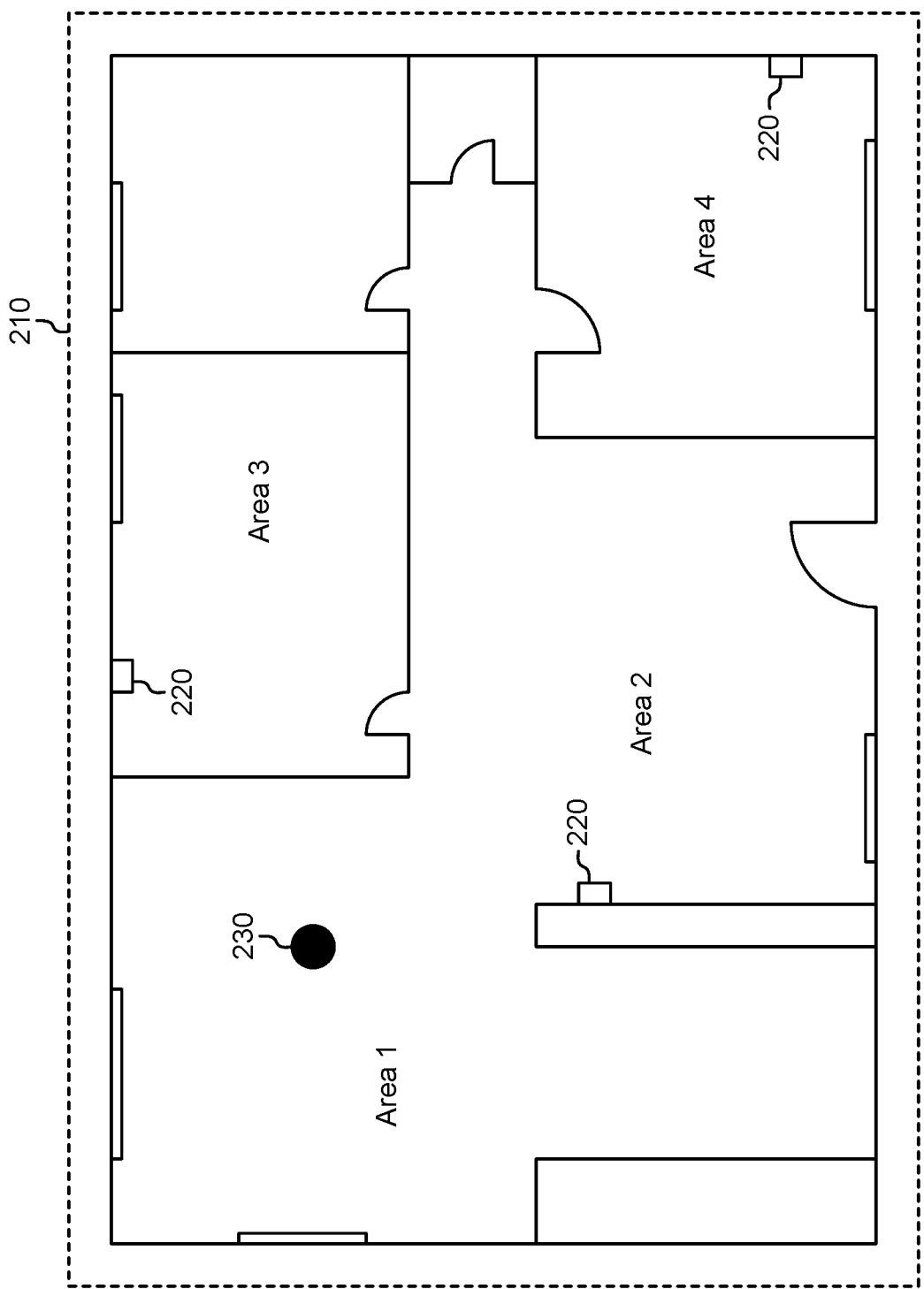
FIG. 2 is a schematic diagram of a geographic location with sub-areas, according to one embodiment.

Referring to FIG. 2, a schematic diagram of a selected geographic location with sub-areas is shown according to an example embodiment. In some embodiments, the mobile device 110 of the account holder may display selected geographic location 210 using display device 114. In some embodiments, details (i.e., the layout) of the geographic location 210, may be entered into the geolocation payment system 150 by an account holder. In some embodiments, sub-areas of the geographic location may be displayed based on the location and range of proximity beacons located within the geographic location. For example, the geolocation payment system may display a schematic of the account holder's house which includes the location and range of proximity beacons located within the geographic location, and display the schematic on mobile devices associated with the account holder and recipient. In other embodiments, GPS tracking may be used, as previously indicated.

In some embodiments, upon selecting a geographic location 210 wherein a selected task is to be performed, the account holder may have an option to select sub-areas within the geographic location 210 to provide different instructions for different sub-areas. For example, as shown in FIG. 2, the selected geographic location represents the account holder's house, which has been divided into four sub-areas, Area 1, Area 2, Area 3, and Area 4, wherein each sub-area may be associated with a range of GPS coordinates or with a tracking device 220 (e.g., low energy proximity beacons that do not transmit outside of their respective sub-areas).

In some embodiments, by selecting geographic location 210, the account holder automatically selects each sub-area within the geographic location, but can then de-select particular sub-areas that do not require services to be performed in. For example, the account holder may deselect Area 4 so that cleaning Area 4 is no longer included as part of a housecleaning assignment. As previously noted, in some embodiments, the system may be integrated with a security system that may detect (e.g., using motion sensors, door sensors, etc.) when the recipient enters the geographic location or an identified sub-area. In some embodiments, the account holder may select an area to be "off limits" and select to receive a notification if the recipient enters such area. For example, an account holder that does not want the recipient to enter their master bedroom may indicate that the master bedroom is "off limits" and should not be cleaned or entered for any purpose. Additionally, by dividing the selected geographic location 210 into sub-areas, the geolocation payment system 150 can determine whether the recipient has in fact completed the assigned task. For example, if the assigned task is to clean the account holder's house, including each sub-area, the geolocation payment system may determine that the assigned task was not completed if the recipient never entered a room that needed to be cleaned.

In some embodiments, the payment system 150 may monitor the amount of time the recipient spends in each particular sub-area (e.g., using GPS, tracking devices, proximity beacons, etc.). Furthermore, the account holder may assign an amount of time the payee should spend in a particular sub-area. For example, upon the account holder selecting one hour of housing cleaning services to be performed by the recipient, the account holder may indicate, that thirty minutes of cleaning should be performed in Area 1, the kitchen, and that the remaining thirty minutes should be divided evenly between the remainder of the house. The account holder may receive a notification based on the amount of time the payee spends in each sub-area and whether the requested time spent in particular sub-areas was properly followed.

In some embodiments, the geolocation payment system 150 continuously monitor the position of the recipient mobile device 120 after the scheduled starting time for the assigned task and only ceases tracking the recipient mobile device 120 after the recipient mobile device 120 exits the geographic location 210. The geolocation payment system 150 may start monitoring the position of the recipient mobile device 120 when the scheduled starting time for the assigned task is scheduled to begin, or a limited predetermined amount of time before then (e.g., in embodiments where GPS is used). In some embodiments, the geolocation payment system 150 may intermittently monitor the position of the recipient mobile device 120. For example, in one embodiment, the geolocation payment system 150 may monitor the position of the recipient mobile device once every minute or less after the recipient mobile device enters the selected geographic location.

Referring back to FIG. 1, the fund requesting logic 127 communicates a fund request via the network interface logic 122 to the source account bank computer system 130. The fund receiving logic 128 determines when payment has been received by the recipient bank computer system 140. In some embodiments, the fund receiving logic 128 triggers a notification to be displayed by display device 124 on recipient mobile device 120.

The geolocation payment system 150 may include program logic executable by account holder mobile device 110 and/or recipient mobile device 120 to implement at least some of the functions described herein. As will be appreciated, the level of functionality that resides on the account holder mobile device 110 and recipient mobile device 120 as opposed to the geolocation payment system 150 may vary depending on the implementation. The geolocation payment system is used in connection with account holder mobile device 110 and recipient mobile device 120. In many embodiments, recipient mobile device 120 is located within the selected geographic location for at least some amount of time to trigger payment. Additionally, individuals offering products or services may be provided with the ability to have a mobile storefront and profile within the geolocation payment system 150. For example, service providers may be provided with the ability to display marketing material, provide information, and promote products or offer discounts.

Figure 3:
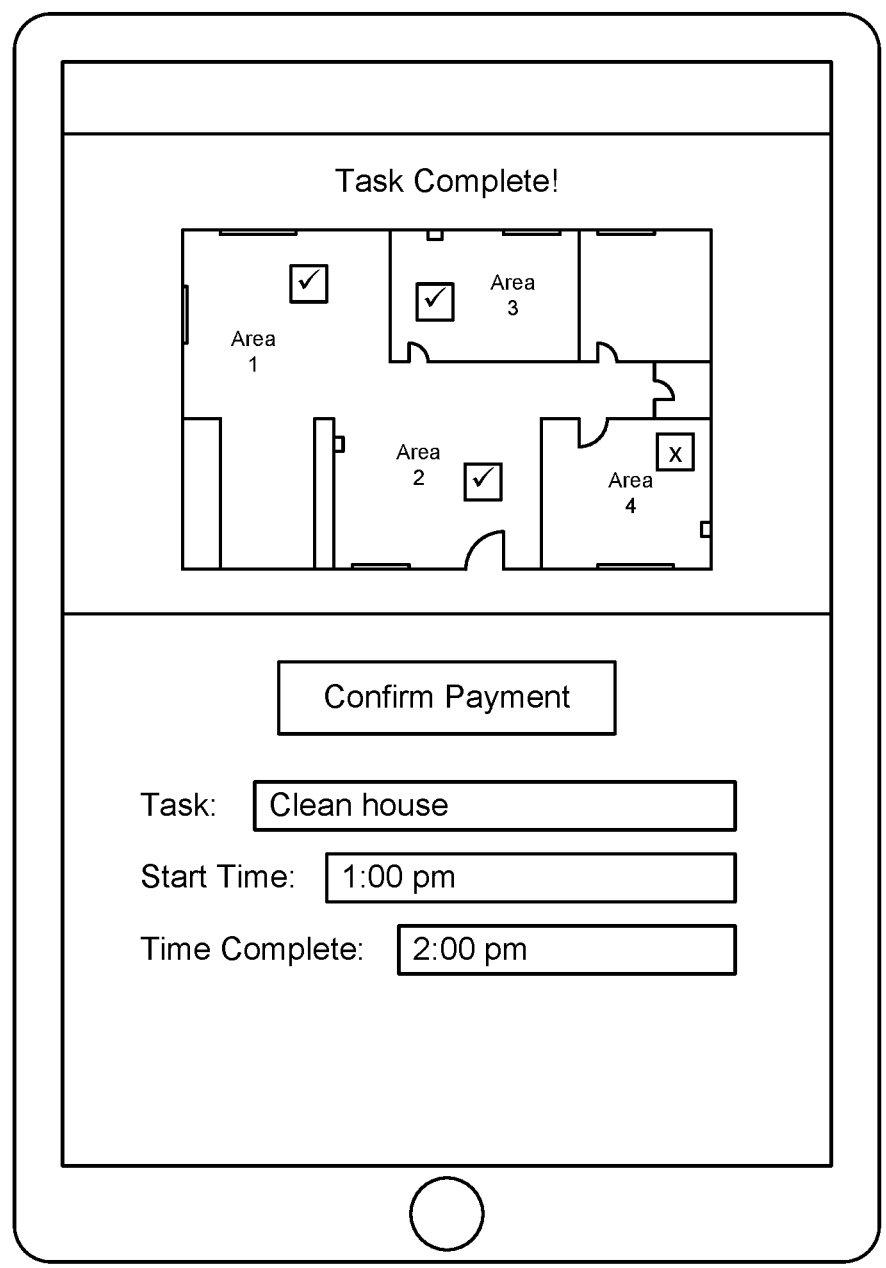
FIG. 3 is an illustration of a display screen of a payment processing system, according to an example embodiment.

Referring now to FIG. 3, a display screen of a payment processing system is shown according to an example embodiment. As shown in FIG. 3, upon the recipient exiting the geographic location, a notification may be generated by notification device 118 and a notification message may be displayed on the display device 114 of the account holder mobile device 110. In some embodiments, the notification may include text that indicates that the selected task has been completed, a description of the selected task, the start time of the selected task, the time that the selected task was completed, and so on. The notification may also include the scheduled start time and scheduled completion times along with the actual start time and actual completion time as well. The notification may also include a button that the account holder selects to send payment to the recipient. As will be appreciated, the geolocation payment system 150 may also automatically electronically transfer payment to the recipient upon determining that the recipient has adequately carried out the assigned task and has exited the geographic location. In some embodiments, the payment system 150 may receive a notification from the recipient bank computer system 140 that payment has been received from the account holder bank computer system 130. The geolocation payment system 150 may notify the recipient that payment has been received by sending a notification message.

In some embodiments, the payment amount for the selected task may increase or decrease based on certain conditions, such as time spent within the geographic location, starting the selected task early or late, or based on movement patterns or movement speed of the recipient within the geographic location. Increases or decreases in payment amount may be automatic or may require approval by the account holder. For example, if two hours of house cleaning time is selected by the account holder, but the recipient spends three hours cleaning the house, the account holder may be prompted to pay the recipient an additional amount of money. Conversely, if the recipient spends only one hour cleaning the house, the recipient may automatically only receive half of the payment amount.

In some embodiments, the location of the recipient 230 may be displayed on the display device 114 of the account holder mobile device 110. The recipient's movements throughout the geographic location may be plotted based on the recipient's position being continuously monitored or by connecting intermittently collected location points. For example, the exact movements of the recipient 230 within the geographic location 210 may be displayed such that the account holder may determine if the selected task was likely completed (e.g., if the task required the recipient to enter a number of sub-areas, and spend the majority time in a particular sub-area, the account holder may check to ensure the recipient did so). In some embodiments, the display device 114 of the account holder mobile device 110 may indicate whether the recipient 230 adequately spent enough time in each sub-area depending on the selected task. For example, as shown in FIG. 3, the display device 114 may indicate that a housecleaner did not spend enough time cleaning the master bedroom, indicated as Area 4, based on the housecleaner spending only five minutes in Area 4 even though the task directions indicated at least fifteen minutes should be spent cleaning Area 4. Based on receiving such information, the account holder may decide to withhold the entire payment, part of the payment, or send a text message to the recipient (e.g., to ask the recipient to explain why the recipient did not follow task directions).

Figure 4:
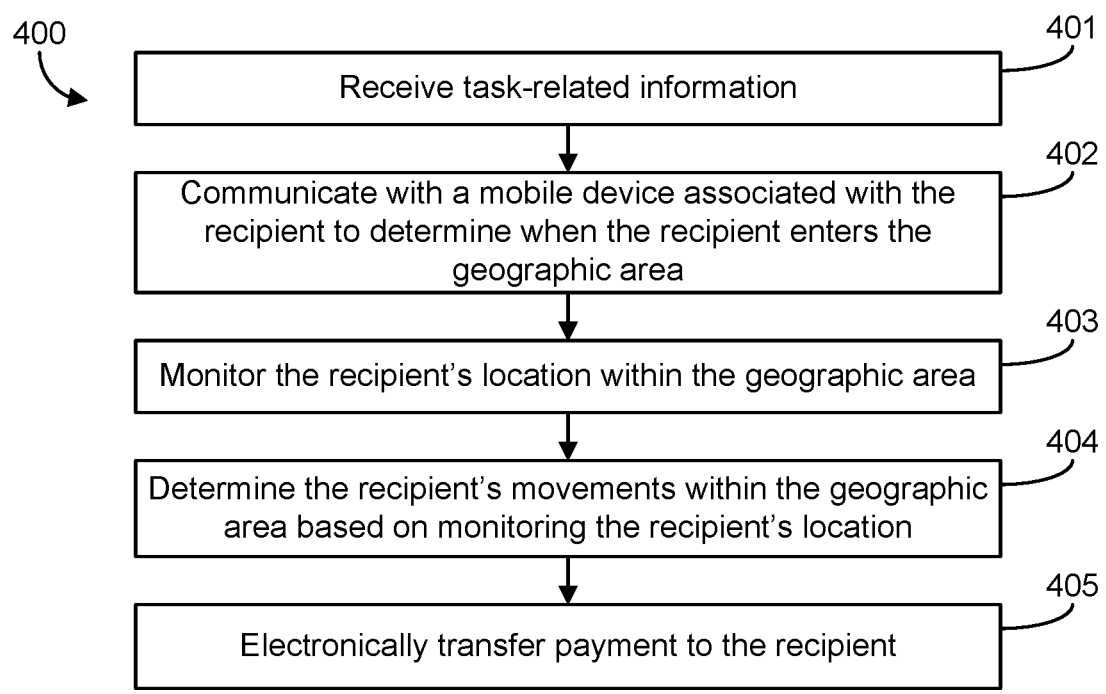
FIG. 4 shows a process for providing payment to a recipient for completion of a task, according to an example embodiment.

Referring now to FIG. 4, a process for providing payment to a recipient for completion of a task is shown according to one embodiment. At step 401, task related information is received from the user. Such information may include, for example, a geographic location is received in which the recipient is to perform the task, an amount of time is received that the recipient must be present within the geographic location, a task is received for a recipient to perform, and/or other information. For example, an account holder may select a cleaning service to clean the account holder's house for two hours or an account holder may select a landscaper to landscape the account holder's front yard. In another example, the account holder may select a firewood supplier to drop an amount of firewood off in the account holder's driveway before lunchtime. At step 402, a mobile device associated with the recipient communicates with the geolocation payment system to determine when the recipient enters the geographic location. For example, in some cases, the geolocation payment system may determine that the recipient entered the geographic location too late and that because of the recipient's untimeliness, the recipient should be paid less. For example, an account holder may request that a caretaker for an elderly parent arrive at a particular time and may reduce or withhold payment if the caretaker is late or does arrive at all. As another example, a babysitter may be paid based on the babysitter arriving at the account holder's house before the account holder's children arrive home from school at 4:00 pm. At step 403, the recipient's position within the geographic location is monitored. For example, the geolocation payment system receives location information for the recipient based on the position of the recipient's mobile device. At step 404, the recipient's movements within the geographic location are determined based on monitoring the recipient's position. For example, using information obtained from proximity beacons located in each sub-area, the geolocation payment system determines the precise movements that the recipient made while in the geographic location, such as walking from a bedroom to the laundry room to the kitchen. Such movements would indicate that a housekeeper made a bed or cleaned up a room, then added clothes to a laundry machine, and finally spent time cleaning dishes in the kitchen sink, therefore, the geolocation payment system would determine that the housekeeper likely cleaned the house instead of relaxing on a couch or leaving only after a short time. At step 405, payment is electronically transferred to the recipient based on the amount of time the recipient is present within the geographic location and based on whether the recipient's movements within the geographic location correspond with the selected task. For example, as discussed above, the geolocation payment system may determine whether the recipient's movements within the geographic location correspond to the task that the recipient was hired to perform.

Figure 5:
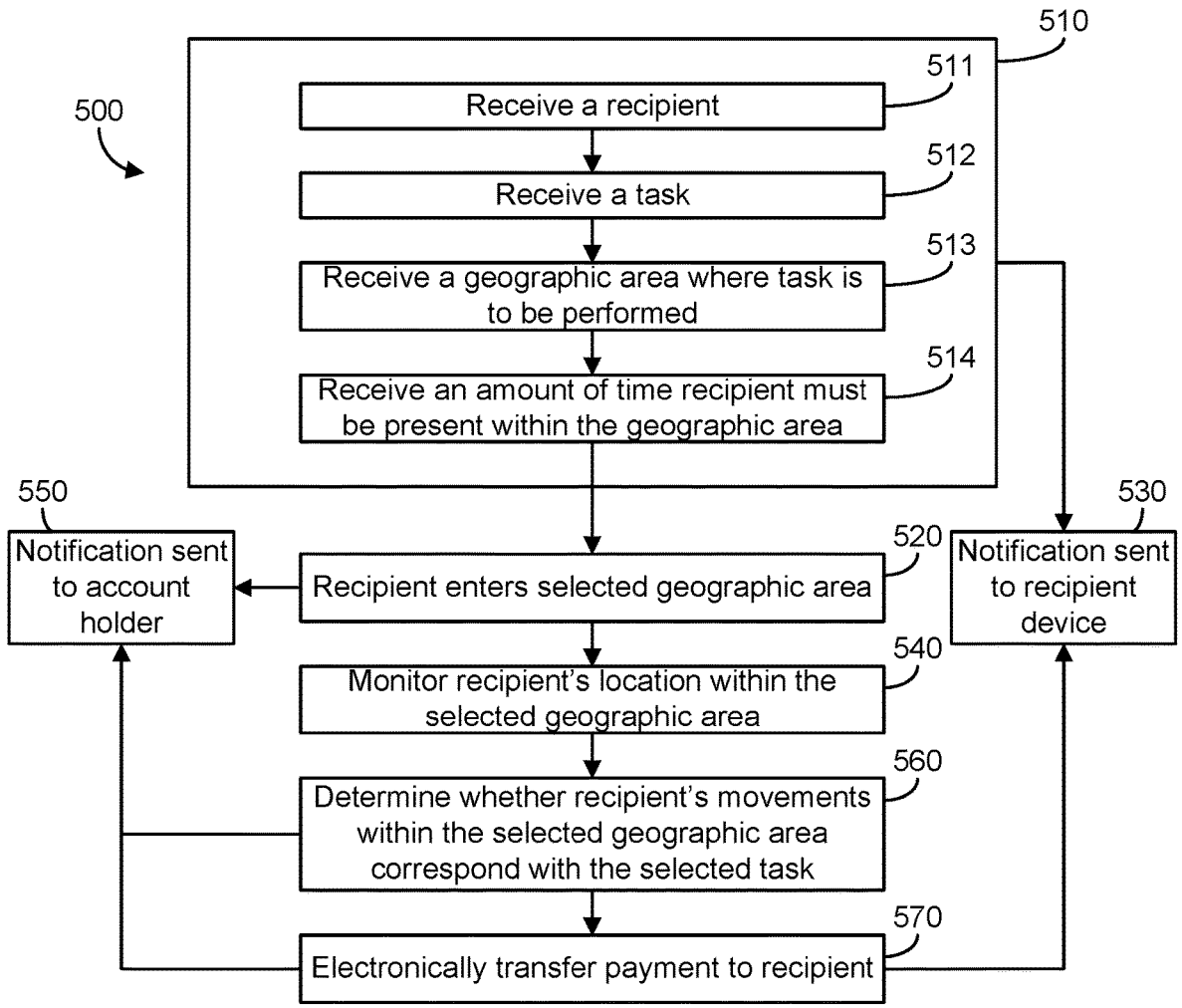
FIG. 5 shows a process for providing payment to a recipient for completion of a task, according to another embodiment.

Referring now to FIG. 5, a process 500 for providing payment to a recipient for completion of a task is shown according to one embodiment. Within step 510, the geolocation payment system receives information relating to a recipient based on a user selection (511), a task selection for the recipient to perform (512), a selected geographic location in which the recipient is to perform the task (513), and a selected amount of time that the recipient must be present within the geographic location (514). Upon step 510 being completed, the recipient receives a notification indicating the task to be performed, the geographic location in which the task is to be performed, and the amount of time the recipient must spend within the geographic location. At step 520, the recipient enters the selected geographic location, at which point a notification may be sent to the account holder (550). At step 540, the recipient's position within the geographic location is monitored. At step 560, the geolocation payment system determines whether the recipient's movements within the selected geographic location correspond with the selected task, at which point a notification may be sent to the account holder (550). At step 570, funds are electronically transferred to the recipient, at which point a notification may be sent to the account holder (550) and to the recipient (530).

The systems, methods, and processes described above are in no way intended to be limiting. Many different embodiments of systems, methods, and processes for providing payment to a recipient is contemplated. In some embodiments, a person to person payment may be facilitated when the recipient arrives at a particular location. Additional requirements may be included, for example, in some embodiments, the recipient must arrive at a geographic location within a certain time frame in order to be eligible to receive payment, or payment for a task can be set to expire after a certain time. For example, an account holder may schedule a payment to be made to a housecleaner only if the housecleaner can complete the task before a certain time, for example, 6:00 pm or any other time that the account holder expects to arrive home. In some embodiments, the geolocation system may be configured to determine if the recipient has entered a geographic location based on the recipient being detected by a home security system.

The systems, methods, and processes described above may be used for making location-based payments for delivery services, taxi or shuttle services, or for keeping track of employees' time spent at work or on a job site. For example, a pizza delivery driver may be automatically paid upon arriving at the delivery destination, or a package delivery service may be paid upon a delivery driver stepping into a doorway at a delivery address. The pizza delivery driver's tip may be automatically calculated and paid based on predetermined arrive conditions (e.g., 20% tip for arriving by 5:00 pm, 15% tip for arriving by 5:20 pm, and no tip if the delivery is made after 5:30 pm). A taxi or shuttle service may be paid based on the time the taxi or shuttle arrives at a selected pickup location, thereby preventing the driver from starting a rate meter early. The same taxi or shuttle service waiting for a particular passenger may also start the rate meter at a predetermined "pickup time" even if the passenger that scheduled the pickup is late. A factory, or other business, may track the time employees arrive at work and the amount of time employees are present at work for purposes of payroll. In another example, parents can transfer money to a child based on the child arriving at a bookstore or grocery store, thereby preventing the child from using the money elsewhere (e.g., a liquor store).

In some embodiments, the payment amount may be based on the amount of time or type of tasks the recipient performed. For example, in one embodiment, the geolocation payment system may determine that a housecleaner spent additional time on more difficult tasks, such as cleaning windows, toilets, or showers based on the amount of time the housecleaner spent in or near those locations.

Such systems, methods, and processes reduce the need to pay for good or services by check or cash while still maintaining additional controls (e.g., the recipient has to be at a certain location to receive payment; in many cases, the recipient will have to be at the location where goods are to be delivered or services rendered. Geolocation-based payments also provide greater security than leaving a check or cash at an unattended location.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the designing of the operating conditions and arrangement of the embodiments without departing from the scope of the present invention.

What is claimed is:

1. A computer-implemented method comprising:
receiving, by a processor, based on a user selection, a task assignment having a completion parameter;
monitoring, by the processor, a position of a recipient within a geographic location associated with the task assignment based on information received from a mobile device of the recipient;
determining, by the processor, movements of the recipient within the geographic location based on monitoring the position of the recipient within the geographic location;
determining, by the processor, that the movements of the recipient demonstrate completion of the completion parameter; and
transferring, by the processor, payment to the recipient for completion of the task assignment via a payment network based on determining completion of the completion parameter.

2. The method of claim 1, further comprising:
determining an amount of time the recipient is within the geographic location, wherein the transferring of the payment is further based on the amount of time the recipient is within the geographic location.

3. The method of claim 1, wherein the completion parameter includes multiple completion parameters, and wherein an amount of the payment is based on which of the completion parameters are completed.

4. The method of claim 1, wherein monitoring the position of the recipient further includes receiving position information from a tracking device, wherein the tracking device is at least one of an electronic appliance, an electronic wall fixture, a camera, a security system, and a proximity beacon.

5. The method of claim 1, further comprising notifying the recipient that the payment has been transferred.

6. The method of claim 1, wherein an amount of the payment is determined based on the movements of the recipient within the geographic location.

7. The method of claim 1, wherein the payment is transferred to the recipient after the recipient leaves the geographic location.

8. The method of claim 1, wherein the geographic location is divided into a plurality of sub-areas.

9. The method of claim 8, further comprising:
receiving a selection of at least one of the plurality of sub-areas where the recipient should not enter; and
notifying the recipient that the recipient should not enter the at least one selected sub-areas.

10. The method of claim 8, further comprising:
monitoring an amount of time the recipient is in each sub-area of the plurality of sub-areas, wherein transferring the payment to the recipient is further based on the amount of time the recipient spent in at least two sub-areas of the plurality of sub-areas, and the amount of time the recipient spent in each sub-area of the at least two sub-areas, wherein monitoring the amount of time is based on geographic location tracking information received from the mobile device of the recipient while the recipient is within each sub-area.

11. A computer system comprising:
a processor and non-tangible machine readable media having instructions stored thereon that, when executed by the processor, cause the processor to:
receive, based on a user selection, a task assignment having a completion parameter and a recipient;
monitor a position of the recipient within a geographic location associated with the task assignment based on information received from a mobile device of the recipient;
determine movements of the recipient within the geographic location based on monitoring the position of the recipient within the geographic location;
determine that the movements of the recipient demonstrate completion of the completion parameter; and
transfer, a payment to the recipient for completion of the task assignment via a payment network based on determining completion of the completion parameter.

12. The system of claim 11, wherein the instructions further cause the processor to:
determine an amount of time the recipient is within the geographic location, wherein transferring the payment is further based on the amount of time the recipient is within the geographic location.

13. The system of claim 12, wherein an amount of the payment is determined based on the amount of time the recipient is determined to be within the geographic location.

14. The system of claim 13, wherein the amount of the payment is determined based on the movements of the recipient within the geographic location.

15. The system of claim 11, wherein the geographic location is divided into a plurality of sub-areas.

16. The system of claim 15, wherein the instructions further cause the processor to:
 receive a selection of at least one of the plurality of sub-areas that the recipient should not enter; and
 notify the recipient that the recipient should not enter the at least one selected sub-areas.

17. The system of claim 16, wherein the instructions further cause the processor to:
 monitor an amount of time the recipient is in each sub-area of the plurality of sub-areas, wherein transferring the payment to the recipient is further based on the amount of time the recipient spent in each sub-area of the plurality of sub-areas.

18. The system of claim 11, wherein monitoring the position of the recipient further includes receiving position information from a tracking device, wherein the tracking device is at least one of an electronic appliance, an electronic wall fixture, a camera, a security system, and a proximity beacon.

19. A computer-implemented method comprising:
 receiving, by a processor, based on a user selection, a task assignment for a recipient to perform including a completion parameter and a geographic location for the task assignment;
 transmitting, to a mobile device of the recipient, the task assignment, the completion parameter, and the geographic location;
 monitoring, by the processor, a position of the recipient within the geographic location based on information received from the mobile device of the recipient;
 determining, by the processor, movements of the recipient within the geographic location based on monitoring the position of the recipient within the geographic location;
 determining, by the processor, that the movements of the recipient demonstrate completion of the completion parameter; and
 transferring a payment to the recipient based on determining completion of the completion parameter.

20. The method of claim 19, wherein the geographic location is divided into a plurality of sub-areas.

21. The method of claim 20, further comprising:
 receiving a selection of at least one of the plurality of sub-areas that the recipient should not enter; and
 notifying the recipient that the recipient should not enter the at least one selected sub-areas.

22. The method of claim 20, further comprising:
 monitoring an amount of time the recipient is in each sub-area of the plurality of sub-areas, wherein transferring the payment to the recipient is further based on the amount of time the recipient spent in each sub-area of the plurality of sub-areas.

23. The method of claim 19, wherein monitoring the position of the recipient further includes receiving position information from a tracking device, wherein the tracking device is at least one of an electronic appliance, an electronic wall fixture, a camera, a security system, and a proximity beacon.

* * * * *